United States Patent
Hanebuth et al.

(10) Patent No.: US 10,815,649 B2
(45) Date of Patent: Oct. 27, 2020

(54) METHOD AND DEVICE FOR COOLING A FLUID STREAM OF AN ELECTROLYSIS UNIT AND FOR OBTAINING WATER

(71) Applicant: Siemens Aktiengesellschaft, Munich (DE)

(72) Inventors: Marc Hanebuth, Nuremberg (DE); Andreas Reiner, Baiersdorf (DE); Markus Ungerer, Baiersdorf (DE); Knut Siegert, Uttenreuth (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/477,140

(22) PCT Filed: Dec. 21, 2017

(86) PCT No.: PCT/EP2017/084017
§ 371 (c)(1),
(2) Date: Jul. 10, 2019

(87) PCT Pub. No.: WO2018/130398
PCT Pub. Date: Jul. 19, 2018

(65) Prior Publication Data
US 2019/0352887 A1  Nov. 21, 2019

(30) Foreign Application Priority Data
Jan. 13, 2017 (EP) .................................. 17151343

(51) Int. Cl.
*E03B 3/28* (2006.01)
*B01D 1/00* (2006.01)
(Continued)

(52) U.S. Cl.
CPC .............. *E03B 3/28* (2013.01); *B01D 1/0058* (2013.01); *B01D 1/16* (2013.01); *B01D 3/346* (2013.01);
(Continued)

(58) Field of Classification Search
CPC ........ B01D 1/0058; B01D 1/16; B01D 3/346; B01D 5/003; B01D 5/006; C02F 1/048;
(Continued)

(56) References Cited

U.S. PATENT DOCUMENTS

| 3,345,272 A * | 10/1967 | Collins | ................ C02F 1/10 203/11 |
| 2005/0230238 A1* | 10/2005 | Klausner | ............... B01D 5/003 203/10 |
| 2008/0135495 A1* | 6/2008 | Sher | .................... B01D 53/261 95/118 |

FOREIGN PATENT DOCUMENTS

| DE | 25 34 621 A1 | 3/1976 | |
| DE | 102012211343 A1 * | 8/2013 | ............... C02F 1/16 |

(Continued)

OTHER PUBLICATIONS

DE102012211343A1_ENG (Espacenet machine translation of Hahn) (Year: 2013).*

(Continued)

*Primary Examiner* — Jonathan Miller
*Assistant Examiner* — Gabriel E Gitman
(74) *Attorney, Agent, or Firm* — Slayden Grubert Beard PLLC

(57) ABSTRACT

A method for cooling a fluid from an electrolysis unit and extracting water from ambient air comprising: conducting moist air having a first molar amount of water and raw water into an evaporator unit in a counterflow at a temperature at or below the boiling temperature of the water; evaporating (Continued)

pure water from the raw water into the moist air and cooling the raw water; conducting the cooled raw water into a heat exchanger thereby cooling the fluid stream of the electrolysis unit; conducting the moist air and the pure water into a water extraction unit; separating a second molar amount of the pure water off from the moist air in the water extraction unit, wherein a third molar amount of water remaining in the air is less than the first; conducting the preheated raw water back to the evaporator; and conducting the cooled fluid back into the electrolysis unit.

11 Claims, 2 Drawing Sheets

(51) Int. Cl.
| | | |
|---|---|---|
| *C02F 1/16* | (2006.01) | |
| *B01D 1/16* | (2006.01) | |
| *B01D 3/34* | (2006.01) | |
| *B01D 5/00* | (2006.01) | |
| *C02F 1/04* | (2006.01) | |
| *C02F 1/12* | (2006.01) | |
| *C25B 1/04* | (2006.01) | |
| *C25B 15/08* | (2006.01) | |

(52) U.S. Cl.
CPC ............. *B01D 5/003* (2013.01); *B01D 5/006* (2013.01); *C02F 1/048* (2013.01); *C02F 1/12* (2013.01); *C02F 1/16* (2013.01); *C25B 1/04* (2013.01); *C25B 15/08* (2013.01); *B01D 5/0027* (2013.01)

(58) Field of Classification Search
CPC ..... C02F 1/12; C02F 1/16; C25B 1/04; C25B 15/08; E03B 3/28; Y02A 20/109; Y02E 60/366; Y02P 20/129
See application file for complete search history.

(56) References Cited

FOREIGN PATENT DOCUMENTS

| DE | 102014217462 A1 | 3/2016 | ................ C02F 1/28 |
|---|---|---|---|
| WO | 2003/068358 A1 | 8/2003 | ................ B01D 1/16 |
| WO | 2011/066841 A1 | 6/2011 | |
| WO | 2012/156646 A1 | 11/2012 | ................ B01D 1/14 |
| WO | WO2013113631 A1 * | 8/2013 | ................ C25B 1/10 |

OTHER PUBLICATIONS

WO2013113631A1_ENG (Espacenet machine translation of Hammer) (Year: 2013).*
Search Report for International Application No. PCT/EP2017/084017, 6 pages.
European Office Action, Application No. 17836027.7, 5 pages.

* cited by examiner

METHOD AND DEVICE FOR COOLING A FLUID STREAM OF AN ELECTROLYSIS UNIT AND FOR OBTAINING WATER

CROSS-REFERENCE TO RELATED APPLICATIONS

This application is a U.S. National Stage Application of International Application No. PCT/EP2017/084017 filed Dec. 21, 2017, which designates the United States of America, and claims priority to EP Application No. 17151343.5 filed Jan. 13, 2017, the contents of which are hereby incorporated by reference in their entirety.

TECHNICAL FIELD

The present disclosure relates to electrolysis. Various embodiments include methods and/or apparatus for cooling a fluid stream of an electrolysis unit and the extraction of water.

BACKGROUND

The demand for power varies greatly over the course of the day. The generation of power also varies, with an increasing proportion of power from renewable energies during the course of the day. In order to be able to compensate for an excessive supply of power during periods with a lot of sun and strong wind when demand for power is low, use may be made of regulable power plants or storage means which store this energy. To store the renewable energy, electrolysis is an appealing possibility. In the event of surplus power, water is decomposed into the components hydrogen and oxygen. Hydrogen and oxygen can be subsequently stored. If energy is required again, then it is possible, in particular by means of a fuel cell, for power to be generated in turn from hydrogen and oxygen.

As a prerequisite for carrying out electrolysis, firstly pure water must be available. One possibility for producing drinking and service water in coastal vicinities lies in the desalination of seawater. Normally, the drinking and service water is produced from the seawater by means of reverse osmosis. However, this technology produces large amounts of salt-rich concentrate as waste. This salt-rich concentrate is frequently disposed of by being fed into the sea, where it causes serious environmental damage.

One possible alternative for extracting water, in particular for extracting drinking water, lies in the extraction of water from the air. In the extraction of water from air, the cooling of a surface to below the dew point of the air with an electrically operated cooling machine is in particular known. Below the dew point, the water condenses from the air and can thus be extracted. A disadvantage of this technology is high energy consumption. Even with a refrigeration recovery apparatus or precooling of the incoming air stream, the energy consumption of this water extraction method is disadvantageously high.

Furthermore, a favorable and technically robust cooling system for carrying out the water electrolysis is required in order to remove the waste heat which is constantly generated during the electrolysis. It is difficult to remove the electrolysis waste heat, in particular in tropical and/or subtropical regions. Typically, generation of waste heat is realized in a range from between 60° C. and 100° C. With ambient temperatures of up to 50° C., pure cooling by means of ambient air is disadvantageously only possible with difficulty. The temperature difference between the heat source and the ambient air is then so small that large heat exchangers and relatively high associated investment costs are disadvantageously required. Furthermore, high volume flow rates of cooling medium are typically required, this resulting in relatively high energy consumption, in particular for secondary consumers such as pumps and blowers.

SUMMARY

The teachings of the present disclosure describe methods and apparatus allowing the extraction of water for electrolysis from air and cooling of an electrolysis unit in an energy-efficient manner. For example, some embodiments include a method for cooling a fluid stream (9) of an electrolysis unit (100) and for extracting water from the ambient air, having the following steps: conducting moist air (FL) having a first molar amount of water into an evaporator unit (2), conducting raw water (RW) into the evaporator unit (2) in a counterflow configuration in relation to the moist air (FL), wherein a temperature of at most the boiling temperature of the water prevails in the evaporator unit (2), evaporating pure water (W) from the raw water (RW) into the moist air (FL), wherein the raw water (RW) is cooled, conducting the cooled raw water (RWK) into a heat exchanger (7), and conducting the fluid stream (9) of the electrolysis unit (100) into the heat exchanger (7), wherein heat is transferred from the fluid stream (9) to the raw water (RWW), conducting the moist air with the pure water (FLW) into a water extraction unit (3), and separating a second molar amount of the pure water off from the moist air with water (FLW) in the water extraction unit (3), wherein a third molar amount of water, which remains in the air after the separation of the second molar amount, is less than the first molar amount of water, conducting the preheated raw water (RWW) back into the evaporator unit (2), and conducting the cooled fluid stream (10) back into the electrolysis unit (100).

In some embodiments, the raw water (RW) is extracted from the moist air (FL).

In some embodiments, the temperature in the evaporator unit (2) lies in a range from at least 40° C. to at most 55° C.

In some embodiments, the water extraction unit (3) comprises a condenser, an absorption unit or an adsorption unit (30).

In some embodiments, there is an adsorbent made of silica gel, a molecular sieve or a zeolite.

In some embodiments, the regeneration of the absorbent or adsorbent is carried out in a pressure- and/or temperature-driven manner.

In some embodiments, the condenser (3) is operated by means of a heat medium which is cooled by means of ambient air.

In some embodiments, the second molar amount of pure water (W) is conducted at least partially as educt into the electrolyzer (100).

In some embodiments, the evaporator unit (2) is operated at a lower pressure than the water extraction unit (3).

As another example, some embodiments include an apparatus (1) for cooling a fluid stream (9) of an electrolysis unit (100) and for extracting water from the ambient air, for carrying out a method as described above, comprising an evaporator unit (2), which is suitable for evaporating pure water from raw water (RW) into a moist air stream (FL), and an electrolyzer (100), wherein a fluid stream (9) of the electrolyzer (100) is able to be cooled by means of the raw water (RW).

In some embodiments, there is a first heat exchanger (7) which is suitable for heating, by means of the waste heat of an electrolyzer (100), the raw water (RWK) prior to the latter being conducted into the evaporator unit (2).

In some embodiments, the first heat exchanger (7) is a liquid-liquid heat exchanger.

In some embodiments, the evaporator unit (2) comprises a structured packing or a random packing.

BRIEF DESCRIPTION OF THE DRAWINGS

Further features, properties and advantages of the embodiments of the present teachings will emerge from the following description with reference to the appended figures, in which, schematically.

DETAILED DESCRIPTION

Figure 1:
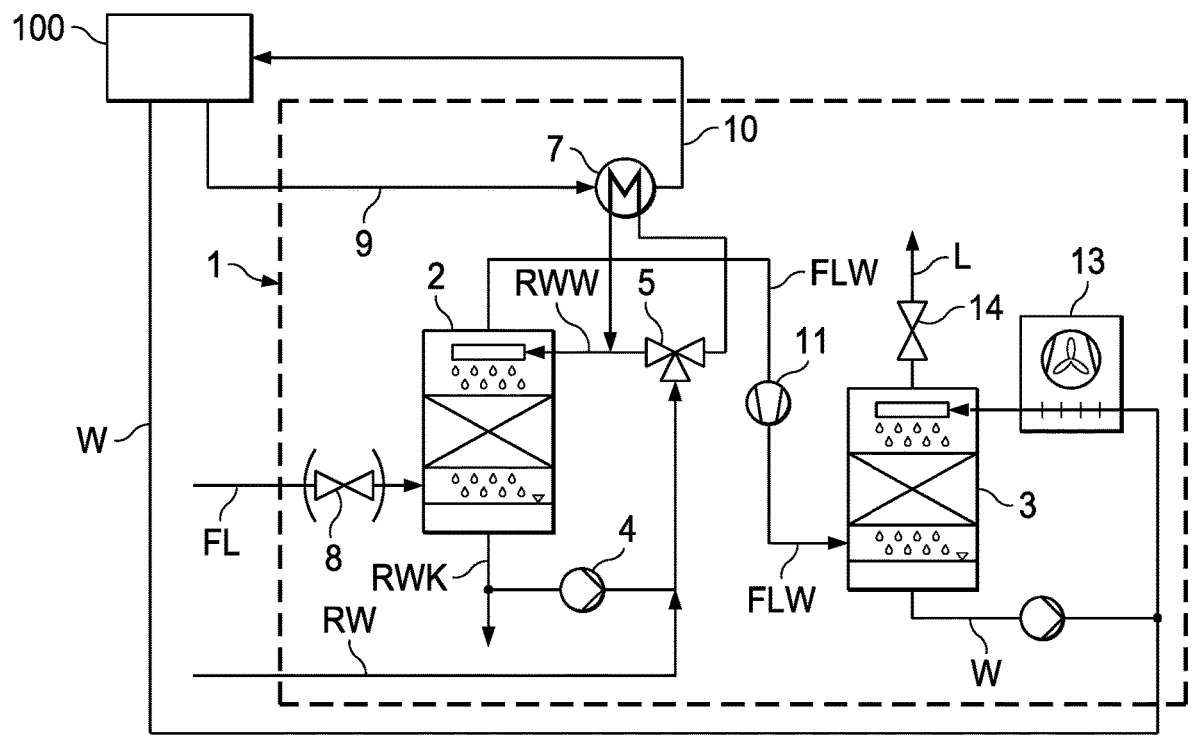
FIG. 1 shows an apparatus for electrolysis cooling and water extraction, having an evaporator unit and a water extraction unit.

An example method incorporating teachings herein for cooling a fluid stream of an electrolysis unit comprises multiple steps. Firstly, moist air comprising a first molar amount of water is conducted into an evaporator unit. Raw water is then conducted into the evaporator unit in a counterflow configuration in relation to the moist air, wherein a temperature of at most the boiling temperature of the water prevails in the evaporator unit. Then, pure water evaporates from the raw water into the moist air, wherein the raw water is cooled. The cooled raw water is conducted into a heat exchanger. The fluid stream of the electrolysis is also conducted into the heat exchanger. In the heat exchanger, heat of the fluid stream is transferred to the raw water. The moist air with the pure water is conducted into the water extraction unit. In the water extraction unit, a second molar amount of pure water is separated off from the moist air, wherein a third molar amount of water, which remains in the air after the separation of the water, is less than the first molar amount of water. The preheated raw water is conducted back into the evaporator unit. The cooled fluid stream is conducted back into the electrolysis unit.

Some embodiments include an apparatus for carrying out the methods described above for cooling a fluid stream of an electrolysis unit and for extracting water from ambient air comprises an evaporator unit, which is suitable for evaporating pure water from raw water into moist air, and an electrolyzer, wherein a fluid stream of the electrolyzer is able to be cooled by means of the raw water. Water is extracted from the air which is enriched with water and which exits the evaporator unit. In some embodiments, the amount of extracted water exceeds the amount of water evaporated in the evaporator unit. Water is thus extracted from the air overall and can be used as educt in the electrolysis.

In some embodiments, the fluid stream of the electrolysis is cooled in a heat exchanger by means of a raw water stream. The heat transfer between two liquids may be particularly good. The required temperature differences may therefore be small in comparison with an air-water cooling process. In some embodiments, the raw water stream is preheated before it passes into the evaporator. In this way, the evaporation process is improved, with the result that the efficiency of the whole method may be increased.

In some embodiments, the raw water is extracted substantially from the moist air. In some embodiments, the apparatus and the method then require no further water sources. In some embodiments, water is separated off that is so pure that use may also be made of it in the form of an educt stream for the electrolysis. This increases the efficiency of the electrolysis method and makes the selection of the site for the electrolysis operation significantly more flexible, since no water sources need to be present locally.

In some embodiments, the temperature in the evaporator unit lies in a range from at least 40° C. to at most 55° C. This temperature is sufficiently high for the moist air to be able to take up a sufficiently large amount of water from the raw water. In some embodiments, these temperatures to be reached solely by the preheating of the raw water in the first heat exchanger by means of the waste heat of the electrolyzer.

In some embodiments, use is made of a condenser, an absorption unit or an adsorption unit as the water extraction unit. A condenser is to be understood here as meaning a process engineering apparatus for condensing a liquid from a gas. In some embodiments, use is made of silica gel, a molecular sieve or a zeolite as an adsorbent.

In some embodiments, the condenser is operated by means of a heat medium which can be cooled by means of ambient air. In particular, the cooling is realized at night, when the ambient temperatures are so low that efficient cooling of the heat medium is possible.

In some embodiments, the evaporator unit is operated at a lower pressure than the water extraction unit. In particular, a reduction in the pressure in the evaporator unit leads to it being possible for even more water to pass into the moist air. Consequently, the fraction of the water which can be extracted in the evaporator unit is increased. If the evaporator unit and the condenser are connected to one another via a blower, then this ensures that the pressure is reduced in the evaporator unit and at the same time is increased in the water extraction unit. In some embodiments, this pressure increase leads to a larger amount of water being able to be condensed from the moist air than at ambient pressure. These pressure conditions allow more efficient water extraction.

In some embodiments, the apparatus for the electrolysis cooling comprises a heat exchanger which is suitable for heating, by means of the waste heat of a fluid stream of the electrolyser, the raw water prior to the latter being conducted into the evaporator unit. In some embodiments, in this way, firstly the cooling of the fluid stream of the electrolysis is made possible and secondly the efficiency of the evaporator unit is increased.

In some embodiments, the heat exchanger is a liquid-liquid heat exchanger. In the case of liquid-liquid heat exchangers, the required temperature difference between the two heat-transferring media is significantly less than in the case of gas-liquid heat exchangers.

In some embodiments, the evaporator unit comprises a structured packing or a random packing. This enlarges the surface between the moist air and the raw water such that the largest possible fraction, or the largest possible molar amount, of water can pass into the moist air.

In a first exemplary embodiment, illustrated in FIG. 1, the electrolysis cooling apparatus and water extraction installation 1 comprises an evaporator unit 2 and a water extraction unit 3. Moist air FL is conducted into the evaporator unit 2. A first throttle 8, by means of which the pressure that is established in the evaporator unit 2 is able to be regulated, is optionally present. Typically, the moist air FL is fed at the foot of the evaporator unit 2, in other words at the lower end of the evaporator unit 2. The moist air FL is typically ambient air.

Furthermore, warm raw water RWW is fed into the evaporator unit 2. Typically, this warm raw water RWW is fed at the head of the evaporator unit 2, in other words at the upper end of the evaporator unit 2. The warm raw water RWW is conducted in the evaporator unit 2 in a counterflow configuration in relation to the moist air stream FL and is made to trickle in the evaporator unit 2.

In some embodiments, the evaporator unit 2 comprises fixtures, which lead to the formation of a large exchange surface between the liquid and gaseous phases. Said fixtures may typically comprise structured packings or random packings. A part of the water from the raw water RWW evaporates in the evaporator unit 2 and is thereupon conducted with the moist air stream with water FLW out of the evaporator unit 2. A part of the water remains in the liquid phase of the warm raw water RWW and is conducted as then cooled raw water RWK out of the evaporator unit 2. The cold raw water RWK can then either be conducted out of the process or can be conducted back to the evaporator unit 2 via a first circulating pump 4.

A part of the cold raw water RWK is not conducted back into the evaporator unit 2 but exits the water extraction installation 1, in order to prevent a concentration of impurities, in particular salts. A fraction of the cold raw water RWK, which fraction is to be returned to the evaporator unit 2, is conducted to a first heat exchanger 7 via the first three-way valve 5. Said first heat exchanger 7 is flowed through firstly by the cold raw water RWK and secondly by the warm fluid stream 9 of the electrolysis, which is to be cooled. In some embodiments, the fluid stream 9 comprises water from a water electrolyzer. In some embodiments, the temperature of the fluid stream 9 lies in a range of between 60° C. and 100° C., in particular between 60° C. and 80° C. In some embodiments, a fluid stream of a carbon dioxide electrolyzer is conducted into the heat exchanger 7.

The cooled fluid stream 10 exits the heat exchanger 7. The fluid stream from the electrolysis typically comprises water, in particular from the electrolyte of the electrolyzer. In some embodiments, the water comprises further components in dependence on the type of the electrolyzer. In the case of a PEM electrolyzer, that is to say a water electrolyzer, use is made of almost pure water. In an alkaline electrolyzer, the fluid stream comprises an aqueous KOH solution. In a chlor-alkali electrolyzer, the fluid stream comprises an aqueous NaOH and/or aqueous NaCl solution. In a carbon dioxide electrolyzer, the fluid stream comprises an aqueous solution with a conductive salt.

The first three-way valve 5 allows the cooling power or the heating power of the first heat exchanger 7 to be set. Since there is a continuous extraction of water from the raw water RW, it is necessary for raw water RW to be supplied continuously or at least semi-continuously to the process, in order to prevent the evaporator unit 2 from drying out.

The cooling of the fluid stream 9 of the electrolysis, and thus also preheating of the raw water RWK in the first heat exchanger prior to the feeding thereof to the evaporator unit 2, is expedient in particular in warm, that is to say in subtropical and tropical, climatic regions. Disadvantageous in these warm climatic regions is highly energy-intensive and thus also expensive cooling. At an ambient air temperature of in particular at least 30° C., it also happens in this case that the ambient air, which is added as moist air FL to the evaporator unit 2, is completely saturated with water. In order to still be able to evaporate water from the raw water into the moist air saturated at ambient temperature, and thus to be able to reduce the temperature of the raw water in the evaporator unit 2 to such an extent that the cooling power of the cooled raw water RWK is sufficient for the fluid stream 9 of the electrolysis, the temperature in the evaporator unit 2 must be above the temperature of the moist air FL, in particular the ambient air.

In some embodiments, the evaporator unit 2 is therefore heated to temperatures above temperatures of the moist air FL, at least to 30° C., or in a range from 40° C. to 55° C., by means of the preheated raw water RWW. In order to evaporate a sufficient amount of water from the warm raw water RWW into the moist air and thus to reduce the temperature of the raw water sufficiently for cooling, a sufficient temperature difference of at least 5 K, or of at least K, should prevail, with the moist air having the lower temperature.

As an example of a possible cooling power of the cold raw water RWK, use may be made of the following data. At an ambient temperature of approximately 30° C., the maximum substance amount fraction of water in the ambient air is approximately 4 mol %. Even for the case in which the ambient air has a substance amount fraction of water of 4 mol %, that is to say is close to the saturation of the ambient air with water, the volumetric flow rates of the moist air can be increased by means of the blower 11 such that a cooling power is sufficiently high at all times. In some embodiments, a volumetric flow rate of 6.5 m$^3$/s at an evaporator unit temperature of 40° C. or a volumetric flow rate of 1.9 m$^3$/s at 55° C. in the evaporator unit 2 allows an advantageously sufficiently high cooling power for the cooling of the fluid stream of the electrolysis of in particular 400 kW to be achieved.

In some embodiments, the moist air enriched with water FLW is then conducted into a water extraction unit 3. In this first example, the water extraction unit 3 is in particular a condenser. A condenser is to be understood here as meaning a processing engineering apparatus which allows the condensation of a medium.

In some embodiments, the flowing of the moist air with water FLW is promoted by a blower 11. The blower 11 is able to increase the volumetric flow rate such that the cooling power of the evaporator unit 2 is sufficiently high for the cooling of the fluid stream of the electrolysis. In some embodiments, the blower 11 may influence the pressure conditions in the evaporator unit 2 and the water extraction unit 3 such that a negative pressure prevails in the evaporator unit 2 in comparison with the water extraction unit 3. By means of the second throttle 14, an increase in the pressure in the condenser 3 in combination with the operation of the blower 11 is able to be realized in a regulable manner. In some embodiments, both a larger amount of water evaporates from the raw water into the moist air FL in the evaporator unit 2 and a larger fraction of water can condense in the water extraction unit 3.

Water W is conducted into the condenser 3 from above and is made to trickle via fixtures, in particular via random packings. The moist air with the water FLW is conducted from the foot of the condenser 3 upward in a counterflow configuration in relation to the water W. The fixtures in turn allow a large exchange surface. However, by contrast to the evaporator unit 2, the water which is conducted into the condenser 3 has been cooled beforehand. The water W is therefore conducted as cold water into the condenser 3. This leads to the condensation of the water which is conducted into the condenser 3 in the moist air stream FLW. If the blower 11 is operated such that a negative pressure prevails in the evaporator unit 2 and a positive pressure prevails in the water extraction unit 3, it is additionally the case that the condensation becomes possible at relatively high temperatures, in particular the temperatures which prevail in the evaporator unit 2, e.g., 40° C. to 55° C.

At a temperature of the water of 50° C., the pressure in the condenser should consequently be at least 2 bar. If it is still necessary for the temperature of the condenser to be lowered, it is possible for the water to be cooled to a predetermined temperature by way of a cooling device 13. A pressure increase in the condenser 3 is expedient only if the ambient temperature of the condenser 3 is increased as in tropical and subtropical regions. If the ambient temperature is low, that is to say in particular below 30° C., then a pressure increase in the condenser 3 is not expedient.

Figure 2:
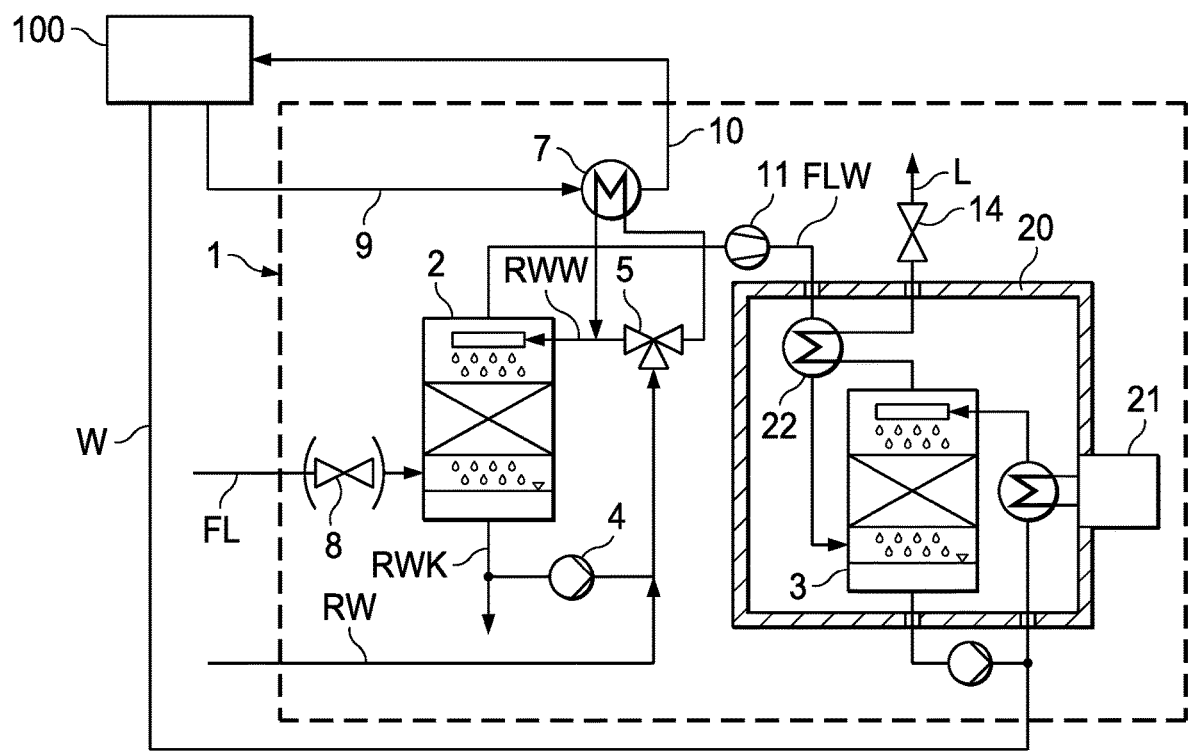
FIG. 2 shows an apparatus for electrolysis cooling and water extraction, having an evaporator unit and a cooling box.
Figure 3:
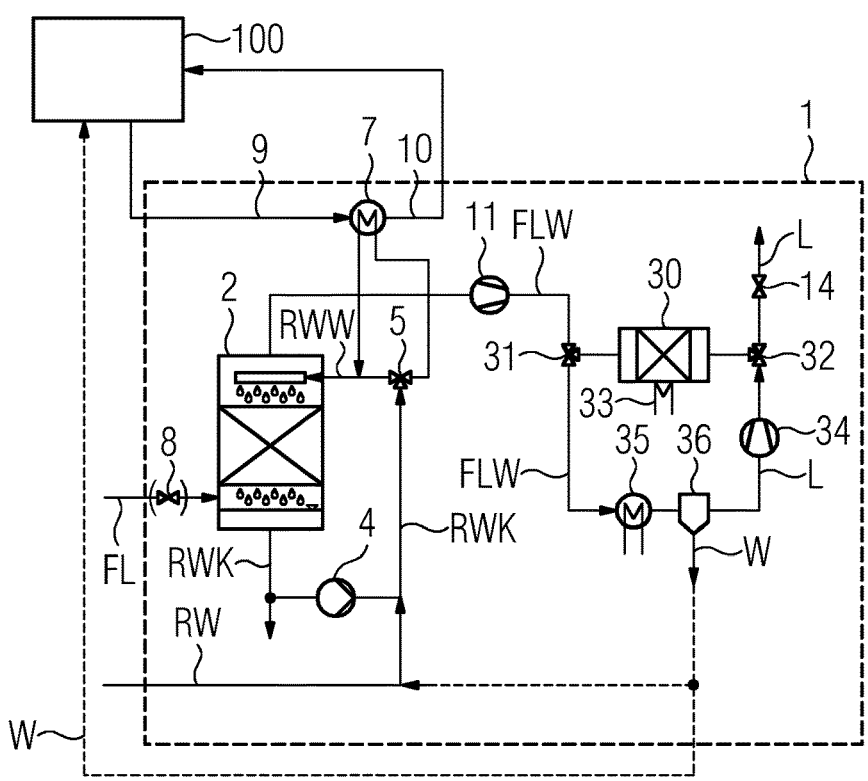
FIG. 3 shows an apparatus for electrolysis cooling and water extraction, having an evaporator unit and an adsorption unit.

FIG. 2 shows an electrolysis cooling apparatus 1 having an evaporator unit 2 and, by contrast to the first exemplary embodiment, having a cooling box 20. Basically, in the secondary exemplary embodiment, as also in the first exemplary embodiment, a fluid stream 9 of an electrolysis unit 100 is cooled in a heat exchanger 7. The cooling of the fluid stream 9 is realized by means of a cooled raw water stream RWK from the evaporator unit 2. A stream of moist air FL is conducted into the evaporator unit 2 in a counterflow configuration in relation to the raw water RW. A fraction of the pure water evaporates from the raw water into the moist air, wherein, on the one hand, the temperature of the raw water is cooled and, on the other hand, the water content of the moist air FL is increased. The moist air with the increased water content FLW is subsequently conducted into a water extraction unit 3.

In this second embodiment, the water extraction unit 3 is accommodated in a cooling box. In other words, a cooling box is thus an enclosed space with a thermally insulated volume in the interior. The temperature of the cooling box 20 is adjusted in a controlled manner to lower temperatures by an active cooling-box cooling apparatus 21, in particular a heat exchanger or an electrically operated cooling apparatus, wherein the water within the condenser 3 is expediently cooled since use may be made here of a liquid-liquid heat exchanger. An additional, optional gas-gas heat exchanger 22 can be used for precooling, with the aid of the gas stream which exits the cooling box 20, the moist air stream which is conducted into the cooling box 20. This reduces the energy requirement of the cooling-box cooling apparatus 21.

In order to extract a sufficiently large amount of water from the ambient air, such that the evaporative effect in the evaporator unit 2 is sufficient for cooling and water for electrolysis can be sufficiently provided, the exiting air L must contain less moisture, that is to say water, than the moist air FL which is conducted into the evaporator unit 2. In one example, the moist air FL comprises a substance amount fraction of water of 1 mol % and the exiting air L is intended to have, as a target specification, a lower water content of 0.5 mol %. If the pressure in the condenser 3 is increased to 2 bar by means of the blower 11 and the throttle 14, then condenser temperatures of approximately 7° C. are necessary for achieving a substance amount fraction of water in the exiting air L of at most 0.5%.

In a third example embodiment, the electrolysis cooling apparatus 1 likewise comprises an evaporator unit 2. By contrast to the first and second embodiments, the electrolysis cooling apparatus 1 comprises an adsorber 30 for extracting water from the moist air enriched with water FLW. The adsorber 30 comprises in its interior an adsorbent which has a high absorption capacity for water. The absorption capacity can be described by means of adsorption isotherms. The adsorption isotherm of a typical adsorbent shows that water is adsorbed onto the adsorbent in particular at low temperatures or relatively high partial water pressures. Typical adsorbents are silica gel, zeolites and other molecular sieves. During the adsorption, the adsorbent is loaded with water. Specific loadings of an adsorbent, also referred to as adsorbate when loaded, may typically lie in the region of more than 10 g of water per 100 g of adsorbent.

During the separation of the water from the moist air laden with water FLW, the third three-way valve 31 and the fourth three-way valve 32 are switched such that the moist air stream with water FLW is conducted through the adsorbent and can subsequently be released into the surroundings as air L. It is possible by means of the throttle 14 and the blower 11 for an increase in pressure to be realized in the adsorption unit, said increase in pressure promoting the adsorption. For the desorption of the water, it is subsequently possible for the pressure to be reduced by means of the throttle 14. So-called pressure swing adsorption is thus involved here. As an alternative to a pressure swing adsorption process by means of the throttle 14 and the blower 11, temperature swing adsorption may also be realized. In a temperature swing adsorption process, the adsorption of the water is realized at lower temperatures than for the desorption of the water. With the aid of a heating element 33, the adsorption unit 30 can be heated in order to allow regeneration of the adsorbent. In some embodiments, the heating element 33 comprises a jacket heating means.

During a regeneration of the adsorber 30, that is to say the desorption of the water from the adsorbate, the valve positions of the third and fourth three-way valves 31 and 32 are set such that a circuit of air is formed, which is made to flow by a further, second blower 34. The air stream is then conducted through a cooling element 35, with the result that water condenses out. The regeneration temperature of the air L is above the temperature of the moist air with water FLW from the evaporator unit. This means that this air L can be enriched with a larger fraction of water than the moist air with water FLW. Consequently, the cooling element 35 can be operated at less low temperatures than a comparable direct cooling of the moist air with water FLW downstream of the evaporator unit 2. This advantageously allows cooling by means of air cooling even at very high ambient temperatures.

The water which has condensed out is then separated off in a phase separation apparatus 36 and can optionally be fed at least partially back into the evaporator unit 2 and/or, particularly advantageously, used as educt for an electrolysis process. The use of an adsorbent makes possible a process with almost no loss of adsorbent during the process, which keeps maintenance costs low and maintenance times short. At high ambient temperature, that is to say if the cooling is highly energy-intensive, adsorption is preferred to absorption, particularly also because of the availability of electrical energy for regeneration, which leads to a high temperature level of at least 100° C.

For the case in which it is necessary for the evaporative cooling in the evaporator unit 2 to be carried out at the same time as a desorption process in the adsorber 30, it is expedient for the third three-way valve 31 to be replaced by a 4-port valve in order to be able to operate the blower 11. This is advantageous in particular if the heating element 33 is heated by means of electrical energy which, in particular in the middle of the day, is available from renewable energies in a large amount. This case occurs in particular if the electrical energy comes from a photovoltaic installation which is designed such that more electrical power is available than is required by the electrolysis installation at times of maximum solar radiation.

Instead of the solid desiccant, that is to say the adsorbent, it is also possible for use to be made of liquid desiccants, that is to say absorbents. Aqueous solutions of lithium halides, in particular of LiCl or LiBr, are typical absorbents. However, as absorbent, use may also be made of solutions of other inorganic salts, in particular of potassium or calcium halides, or inorganic salts such as potassium acetate, potassium formate or potassium lactate or else ionic liquids. Any other liquid which reduces the vapor pressure of water is also conceivable as an absorbent, such as in particular glycols, which are already used frequently for the separation of water from gas streams. The loading and regeneration of the absorbent advantageously take place in structured packings, wherein the laden absorbate and the absorbent to be loaded flow over the structured packing or, in other words, are made to trickle. The moist air laden with water FLW (loading) or dry air (desorption) is conducted in a counterflow configuration with respect to the liquid absorbent or absorbate. Typically, the structured packings are arranged in columns. The desorption column may then be heated. It is also possible to heat the stream to be regenerated or the dry air, in order to configure the desorption in an efficient manner. The use of an absorbent makes possible a method with a relatively low pressure loss, with a high volume-based specific capacity and thus a compact installation space, relatively little susceptibility to impurities and trouble-free storage of the desiccant.

Figure 4:
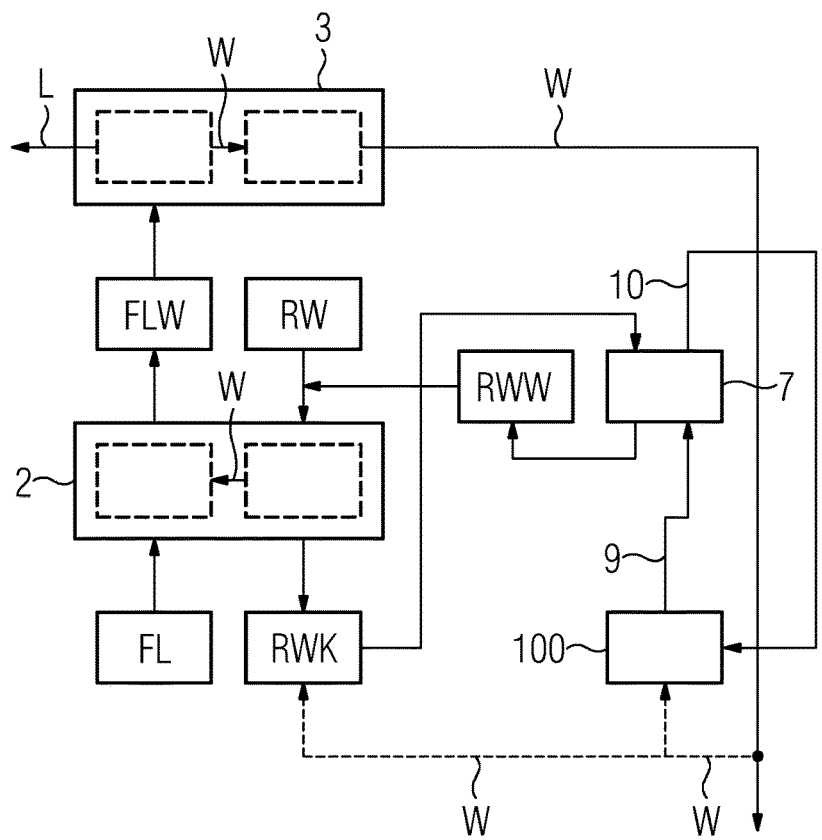
FIG. 4 shows a schematic overview of a method for electrolysis cooling and water extraction.

FIG. 4 shows a schematic overview of an example method for cooling a fluid stream of the electrolysis apparatus 100 by means of a heat exchanger 7, which fluid stream is cooled by cool raw water RWK which flows from an evaporator unit 2. The cooled fluid stream 10 of the electrolysis unit 100 exits the heat exchanger 7. The raw water, which has been preheated in the heat exchanger 7, is conducted as warm raw water RWW into the evaporator unit 2. Fresh raw water RW is also conducted into the evaporator unit 2. Moist air FL is conducted into the evaporator unit 2 in a counterflow configuration in relation to the raw water RW. In the evaporator unit 2, water W passes from the raw water RW into the moist air FL. Moist air enriched with water FLW thus exits the evaporator unit 2.

Said moist air enriched with water FLW is conducted into a water extraction unit 3. In the water extraction unit 3, water W is separated off from the moist air FLW. Air L and water W thus exit the water extraction unit. The water W can optionally either be conducted as educt back into the electrolysis or be conducted as raw water RW back into the evaporator unit 2.

What is claimed is:

1. A method for cooling a fluid stream of an electrolysis unit and extracting water from the ambient air, the method comprising:
    conducting moist air having a first molar amount of water into an evaporator unit;
    conducting raw water into the evaporator unit in a counterflow to a flow of the moist air at a temperature at or below the boiling temperature of the water;
    evaporating pure water from the raw water into the moist air and thereby cooling the raw water; conducting the cooled raw water into a heat exchanger;
    conducting the fluid stream of the electrolysis unit into the heat exchanger, wherein heat is transferred from the fluid stream to the cooled raw water;
    conducting the moist air and the pure water into a water extraction unit;
    separating a second molar amount of the water from the moist air in the water extraction unit, wherein a third molar amount of water remaining in the air after the separation of the second molar amount is less than the first molar amount;
    conducting the raw water from the heat exchanger back into the evaporator unit; and
    conducting the cooled fluid stream back into the electrolysis unit.

2. The method as claimed in claim 1, further comprising extracting the raw water from the moist air.

3. The method as claimed in claim 1, wherein the temperature in the evaporator unit lies in a range from at least 40° C. to at most 55° C.

4. The method as claimed in claim 1, wherein the water extraction unit comprises a condenser or an absorption unit.

5. The method as claimed in claim 4, further comprising, for the case in which the water extraction unit comprises an absorption unit, regenerating the absorbent in a pressure and/or temperature-driven manner.

6. The method as claimed in claim 4, wherein the condenser is cooled by ambient air.

7. The method as claimed in claim 1, further comprising conducting the second molar amount of water at least partially as educt into the electrolyzer.

8. The method as claimed in claim 1, wherein the evaporator unit operates at a lower pressure than the water extraction unit.

9. An apparatus for cooling a fluid stream of an electrolysis unit and extracting water from the ambient air, the apparatus comprising:
    an evaporator unit providing a counterflow of a moist air via a feed, the moist air having a first molar amount of water against raw water at a temperature at or below a boiling temperature of the water, for evaporating pure water from the raw water into the moist air stream;
    a heat exchanger receiving the raw water after leaving the evaporator unit and the fluid stream from an electrolyzer of the electrolysis unit and transferring heat from the fluid stream to the raw water;
    a water extraction unit receiving the moist air from the evaporator unit and separating a second molar amount of water from the moist air, wherein a third molar amount of water remaining in the moist air after the separation of the second molar amount is less than the first molar amount, the water extraction unit comprising an outlet for exiting air;
    wherein the raw water leaves the heat exchanger and flows into the evaporator unit; and
    the fluid stream from the electrolyzer is cooled by the raw water in the heat exchanger.

10. The apparatus as claimed in claim 9, wherein the heat exchanger comprises a liquid-liquid heat exchanger.

11. The apparatus as claimed in claim 9, wherein the evaporator unit comprises a packing.

* * * * *